(12) United States Patent
Chavoustie et al.

(10) Patent No.: US 9,047,266 B2
(45) Date of Patent: Jun. 2, 2015

(54) METHODS, SYSTEMS AND COMPUTER PROGRAM PRODUCTS FOR PROCESSING CELLS IN A SPREADSHEET

(75) Inventors: Michael D. Chavoustie, New Knoxville, OH (US); Andrew M. Eberbach, Seekonk, MA (US); Trevor L. Montgomery, Chapel Hill, NC (US); Joshua M. Woods, Farnhamville, IA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 3358 days.

(21) Appl. No.: 10/960,254

(22) Filed: Oct. 7, 2004

(65) Prior Publication Data

US 2006/0080595 A1  Apr. 13, 2006

(51) Int. Cl.
*G06F 17/00* (2006.01)
*G06F 17/24* (2006.01)

(52) U.S. Cl.
CPC .................................. *G06F 17/246* (2013.01)

(58) Field of Classification Search
CPC ....................................................... G06Q 10/06
USPC ................. 715/212–214, 267, 219–220, 217
See application file for complete search history.

(56) References Cited

U.S. PATENT DOCUMENTS

| | | | |
|---|---|---|---|
| 5,033,009 A | 7/1991 | Dubnoff | |
| 5,255,356 A | 10/1993 | Michelman et al. | |
| 5,325,478 A | 6/1994 | Shelton et al. | |
| 5,553,215 A | 9/1996 | Kaethler | |
| 5,592,666 A * | 1/1997 | Perez | 707/102 |
| 5,701,499 A | 12/1997 | Capson et al. | |
| 5,819,293 A | 10/1998 | Comer et al. | |
| 5,949,416 A | 9/1999 | Bush | |
| 5,987,481 A | 11/1999 | Michelman et al. | |
| 6,006,239 A * | 12/1999 | Bhansali et al. | 707/201 |
| 6,057,837 A * | 5/2000 | Hatakeda et al. | 715/765 |
| 6,341,292 B1 | 1/2002 | Cho et al. | |

(Continued)

FOREIGN PATENT DOCUMENTS

| | | |
|---|---|---|
| GB | 2358936 A | 8/2001 |
| JP | 8180116 A | 7/1996 |

OTHER PUBLICATIONS

Ohio University, Microsoft Excel 2003 Reference Guide, Jul. 2004, Ohio University, pp. 1-25.*

(Continued)

*Primary Examiner* — Manglesh M Patel
(74) *Attorney, Agent, or Firm* — Steven L. Nichols; Van Cott, Bagley, Cornwall & McCarthy P.C.

(57) ABSTRACT

Methods, systems and computer program products are provided for processing cells in a spreadsheet. A first formula contained in a first cell and a second formula contained in a second cell to provide a consolidated formula, wherein the second formula references the output of the first cell are automatically consolidated. The consolidated formula is stored in a single cell. Further methods, systems and computer program products are provided for processing cells in a spreadsheet and wherein a first cell, a second cell that is referenced as a precedent cell by a formula contained in the first cell, and a formula or data contained in the second cell are displayed while hiding the formula contained in the first cell and its value.

21 Claims, 13 Drawing Sheets

(56) References Cited

U.S. PATENT DOCUMENTS

| | | | |
|---|---|---|---|
| 6,460,059 B1 | 10/2002 | Wisniewski | |
| 6,640,234 B1 | 10/2003 | Coffen et al. | |
| 6,766,512 B1 | 7/2004 | Khosrowshahi et al. | |
| 7,251,776 B2 * | 7/2007 | Handsaker et al. | 715/212 |
| 2004/0088650 A1 * | 5/2004 | Killen et al. | 715/503 |
| 2004/0237029 A1 * | 11/2004 | Medicke et al. | 715/503 |
| 2007/0074112 A1 * | 3/2007 | Knauer | 715/538 |

OTHER PUBLICATIONS

"Spreadsheet Formula Highlighting Tool." IBM Technical Disclosure Bulletin, vol. 32, No. 6A, Nov. 1999.

International Search Report and the Written Opinion of the International Searching Authority for PCT Application No. PCT/EP2005/054785 dated May 29, 2006.

Stinson et al.; "Microsoft Office Excel 2003 Inside Out", Microsoft Press, (1993), 14 pages.

"User Interface for a Spreadsheet Program," *IBM Technical Disclosure Bulletin*, (1997), vol. 40 (4), IBM Corp., NY, 2 pages.

Stinson, Craig et al: "Microsoft Office Excel 2003 Inside Out" Aug. 1, 2003, Microsoft Press, XP002381193 ISBN: 073561511X.

"User Interface for a Spreadsheet Program" IBM Technical Disclosure Bulletin, IBM Corp. New York, US, vol. 40, No. 4, Apr. 1997, pp. 9-10, XP000728249 ISSN: 0018-8689.

* cited by examiner

|   | A | B | C | D | E |
|---|---|---|---|---|---|
| 1 | =B2+B4 | | | | |
| 2 | | 75 | | =B4 | |
| 3 | | | | | |
| 4 | | =A7+10 | | | |
| 5 | | | | | |
| 6 | | | =A1*10 | | |
| 7 | 12 | | | | |
| 8 | | | | | |
| 9 | | | | | |

|   | A | B | C | D | E |
|---|---|---|---|---|---|
| 1 | =B2+B4 | | | | |
| 2 | | 75 | | =B4 | |
| 3 | | | | | |
| 4 | | =A7+10 | | | |
| 5 | | | | | |
| 6 | | | =A1*10 | | |
| 7 | 12 | | | ⬇ Consolidate Cell | |
| 8 | | | | | |
| 9 | | | | | |

*110*

*112*

|   | A | B | C | D | E |
|---|---|---|---|---|---|
| 1 |   |   |   |   |   |
| 2 |   | 75 |   | =B4 |   |
| 3 |   |   |   |   |   |
| 4 |   |   |   |   |   |
| 5 |   |   |   |   |   |
| 6 |   |   | formula1(B2,A7) |   |   |
| 7 | 12 |   |   |   |   |
| 8 |   |   |   |   |   |
| 9 |   |   |   |   |   |

|   | A | B | C | D | E |
|---|---|---|---|---|---|
| 1 |   |   |   |   |   |
| 2 |   | 75 |   | REF ERROR! |   |
| 3 |   |   |   |   |   |
| 4 |   |   |   |   |   |
| 5 |   |   |   |   |   |
| 6 |   |   | 970 |   |   |
| 7 | 12 |   |   |   |   |
| 8 |   |   |   |   |   |
| 9 |   |   |   |   |   |

| | A | B | C | D | E |
|---|---|---|---|---|---|
| 1 | | | | | |
| 2 | | 75 | | =B4 | |
| 3 | | | | | |
| 4 | | | | | |
| 5 | | | | | |
| 6 | | | formula1(B2,A7) | | |
| 7 | 12 | | | | |
| 8 | | | | | |
| 9 | | | | | |

|   | A | B | C | D | E |
|---|---|---|---|---|---|
| 1 | =B2+B4 |  |  |  |  |
| 2 |  | 75 |  | =B4 |  |
| 3 |  |  |  |  |  |
| 4 |  | =A7+10 |  |  |  |
| 5 |  |  |  |  |  |
| 6 |  |  | formula1(B2,A7) |  |  |
| 7 | 12 |  |  |  |  |
| 8 |  |  |  |  |  |
| 9 |  |  |  |  |  |

US 9,047,266 B2

METHODS, SYSTEMS AND COMPUTER PROGRAM PRODUCTS FOR PROCESSING CELLS IN A SPREADSHEET

BACKGROUND OF THE INVENTION

The invention relates to spreadsheets in general and, more particularly, to methods, systems and computer program products for processing spreadsheets.

An electronic spreadsheet is a multi-dimensional grid defining cells containing data and formulas that are entered in a manner allowing computer manipulation. The formulas relate and produce results. These formulas may span multiple cells of the spreadsheet and contain interdependencies with other cells of the spreadsheet. Spreadsheets may include large numbers of such occupied cells, which may cause a user difficulty in assessing or viewing the spreadsheet.

SUMMARY OF THE INVENTION

Certain embodiments of the present invention provide methods, systems and computer program products for processing cells in a spreadsheet. According to embodiments of the present invention, a first formula contained in a first cell and a second formula contained in a second cell, and which references the output of the first cell, are automatically consolidated to provide a consolidated formula. The consolidated formula is stored in a single cell.

According to further embodiments of the present invention, a method for processing cells in a spreadsheet comprises displaying a first cell, a second cell that is referenced as a precedent cell by a formula contained in the first cell, and a formula or data contained in the second cell, while hiding the formula contained in the first cell and its value.

Although embodiments of the invention have been described above primarily with respect to methods, according to further embodiments of the present invention, computer program products are provided including a computer readable medium having computer readable program code embodied therein, the computer readable program code comprising computer readable program code configured to execute the respective steps of the methods set forth above. According to further embodiments of the present invention, systems are provided including means for executing the respective steps of the methods set forth above.

BRIEF DESCRIPTION OF THE DRAWINGS

FIG. 6 represents the same spreadsheet as in FIG. 5, except that a cell C6 thereof is selected and a menu box is provided according to embodiments of the invention.

DETAILED DESCRIPTION OF EMBODIMENTS OF THE INVENTION

Figure 1:
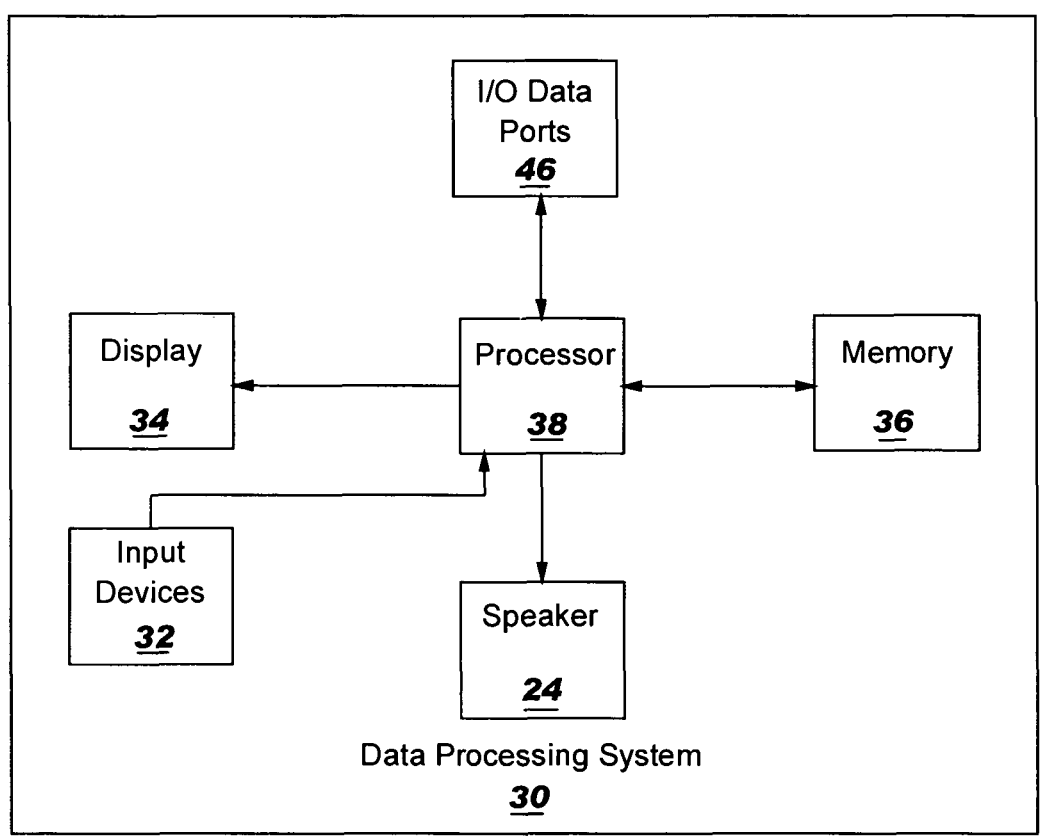
FIG. 1 is a block diagram of a data processing system suitable for use according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "dependency tree" or "dependency chain" means the cells or information contained therein (i.e., data and/or formula(s)) that directly or indirectly depend from a given root cell (referred to as "dependents" of the root cell) or from which a given root cell directly or indirectly depends (referred to as "precedents" of the root cell). A dependency tree may have one or more branches. A "branch cell" is a cell in a dependency tree and may be a dependent cell or a precedent cell.

As used herein, "leaf cell" means a cell that is the last or terminal cell in a branch of a dependency tree of a root cell (i.e., the leaf cell does not depend on any other cell in the spreadsheet). A leaf cell is a kind of branch cell.

Unless otherwise disclosed herein, a user may select a cell, option, feature or other element or function by any suitable means or method, including known and conventional techniques for providing selection input to a computer application. For example, a cell or box may be selected by placing a cursor over the cell or box and clicking a mouse button, tabbing to the cell or box and pressing an "Enter" key, etc.

As will be appreciated by one of skill in the art, the invention may be embodied as methods, data processing systems, and/or computer program products. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA7, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems and/or computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Embodiments of the present invention will now be discussed with respect to FIGS. 1-11. As described herein, embodiments of the present invention provide consolidation of multiple cells of a spreadsheet into a single cell. In this manner, valuable space (i.e., cells) within the spreadsheet may be freed up and complexity of the spreadsheet may be reduced.

The flowcharts and block diagrams of FIGS. 1-11 illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

Referring now to FIG. 1, a block diagram of data processing systems suitable for use in systems according to some embodiments of the present invention will be discussed. As illustrated in FIG. 1, an exemplary embodiment of a data processing system 30 typically includes input device(s) 32 such as a keyboard or keypad, a display 34, and a memory 36 that communicate with a processor 38. The data processing system 30 may further include a speaker 44, and an I/O data port(s) 46 that also communicate with the processor 38. The I/O data ports 46 can be used to transfer information between the data processing system 30 and another computer system or a network. These components may be conventional components, such as those used in many conventional data processing systems, which may be configured to operate as described herein.

Figure 2:
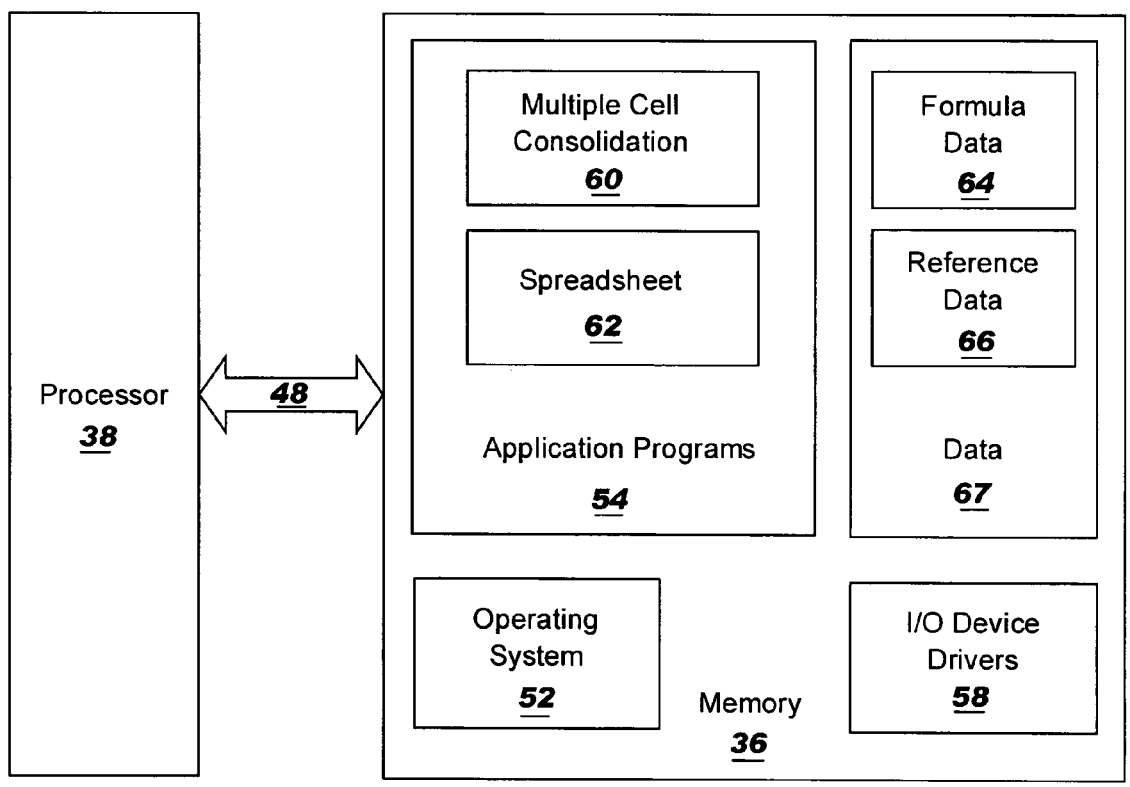
FIG. 2 is a more detailed block diagram of a system for processing a spreadsheet according to some embodiments of the present invention.

FIG. 2 is a block diagram of data processing systems that illustrate systems, methods, and/or computer program products in accordance with embodiments of the present invention. The processor 38 communicates with the memory 36 via an address/data bus 48. The processor 38 can be any commercially available or custom processor, such as a microprocessor. The memory 36 is representative of the overall hierarchy of memory devices containing the software and data used to implement the functionality of the data processing system 30. The memory 36 can include, but is not limited to, the following types of devices: cache, ROM, PROM, EPROM, EEPROM, flash memory, SRAM and/or DRAM.

As shown in FIG. 2, the memory 36 may include several categories of software and data used in the data processing system 30: the operating system 52; the application programs 54; the input/output (I/O) device drivers 58; and the data 67. As will be appreciated by those of skill in the art, the operating system 52 may be any operating system suitable for use with a data processing system, such as OS/2, AIX or System390 from International Business Machines Corporation, Armonk, N.Y., Windows95, Windows98, Windows2000 or WindowsXP from Microsoft Corporation, Redmond, Wash., Unix or Linux. The I/O device drivers 58 typically include software routines accessed through the operating system 52 by the application programs 54 to communicate with devices such as the I/O data port(s) 46 and certain memory 36 components. The application programs 54 are illustrative of the programs that implement the various features of the data processing system 30. Finally, the data 67 represents the static and dynamic data used by the application programs 54, the operating system 52, the I/O device drivers 58, and other software programs that may reside in the memory 36.

As is further seen in FIG. 2, the application programs 54 may include a multiple cell consolidation module 60 and at least one spreadsheet application 62.

The data portion 67 of memory 36, as shown in the embodiments illustrated in FIG. 2, may include formula data 64 and reference data 66.

While embodiments of the present invention have been illustrated in FIG. 2 with reference to a particular division between application programs, data and the like, the present invention should not be construed as limited to the configuration of FIG. 2 but is intended to encompass any configuration capable of carrying out the operations described herein.

Spreadsheets and their operation are well known to those of skill in the art and therefore will not be described in detail herein. A spreadsheet is typically represented in a computer program as a two dimensional array of data structures associated with respective cells. Each data structure contains, among other things, data or a formula of the cell, a linked list of pointers to cells that depend on the cell (referred to as dependents), and a linked list of pointers to cells from which that cell depends (referred to as precedents or reference cells). A formula includes one or more mathematical operations to be performed and any cell references or sources for values required for the mathematical operation(s). A formula may include only a cell reference. Conceptually, the pointers form a dependency tree, wherein the reference cell may be referred to as a root cell and the dependent cells and precedent cells terminating branches of the tree may be referred to as leaf cells. Cells in the tree may be characterized by their level, that is, the number of steps between the branch cell and a given root cell.

The spreadsheet application may be configured to evaluate a cell to determine if there are any cells mentioned in the formula of the cell. The application may likewise evaluate the mentioned cell or cells and so forth to map the dependency and/or precedence interrelationships between all or selected ones of the cells of the spreadsheet. Such evaluations may be made in any suitable manner. In use, a spreadsheet may be operable to automatically calculate solutions for the formulas of the cells by retrieving values of the cell references in the formula and performing the mathematical operations defined by the formula. Systems and methods for assessing and updating dependency chains among cells of a spreadsheet are well known to those of skill in the art. For example, a suitable method is described in U.S. Pat. No. 6,460,059 to Wisniewski, the disclosure of which is incorporated herein by reference in its entirety.

Figure 3:
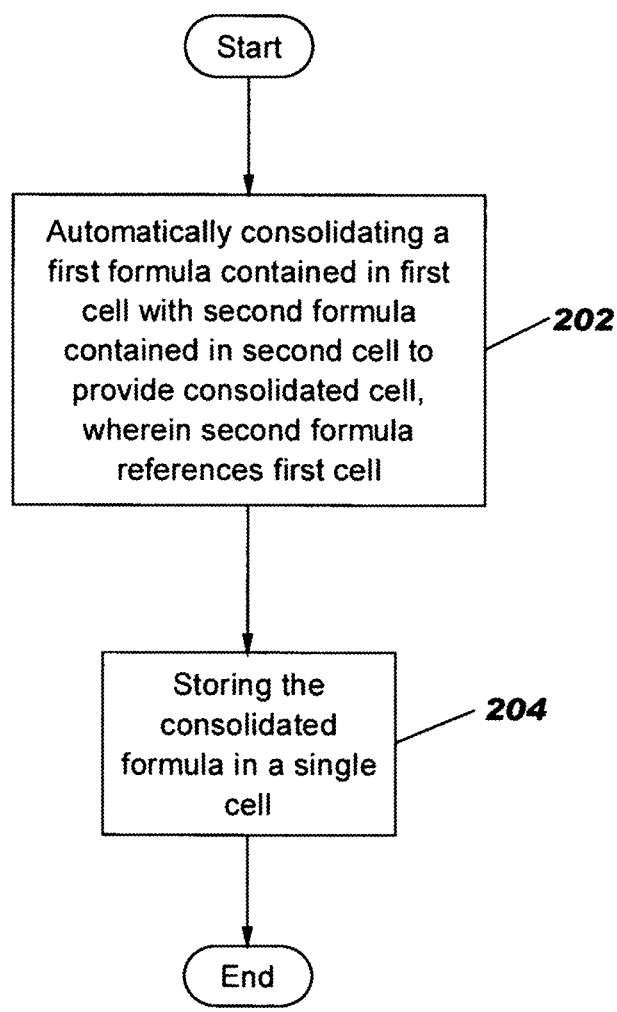
FIG. 3 is a flowchart illustrating operations for processing a spreadsheet according to some embodiments of the present invention.
Figure 4:
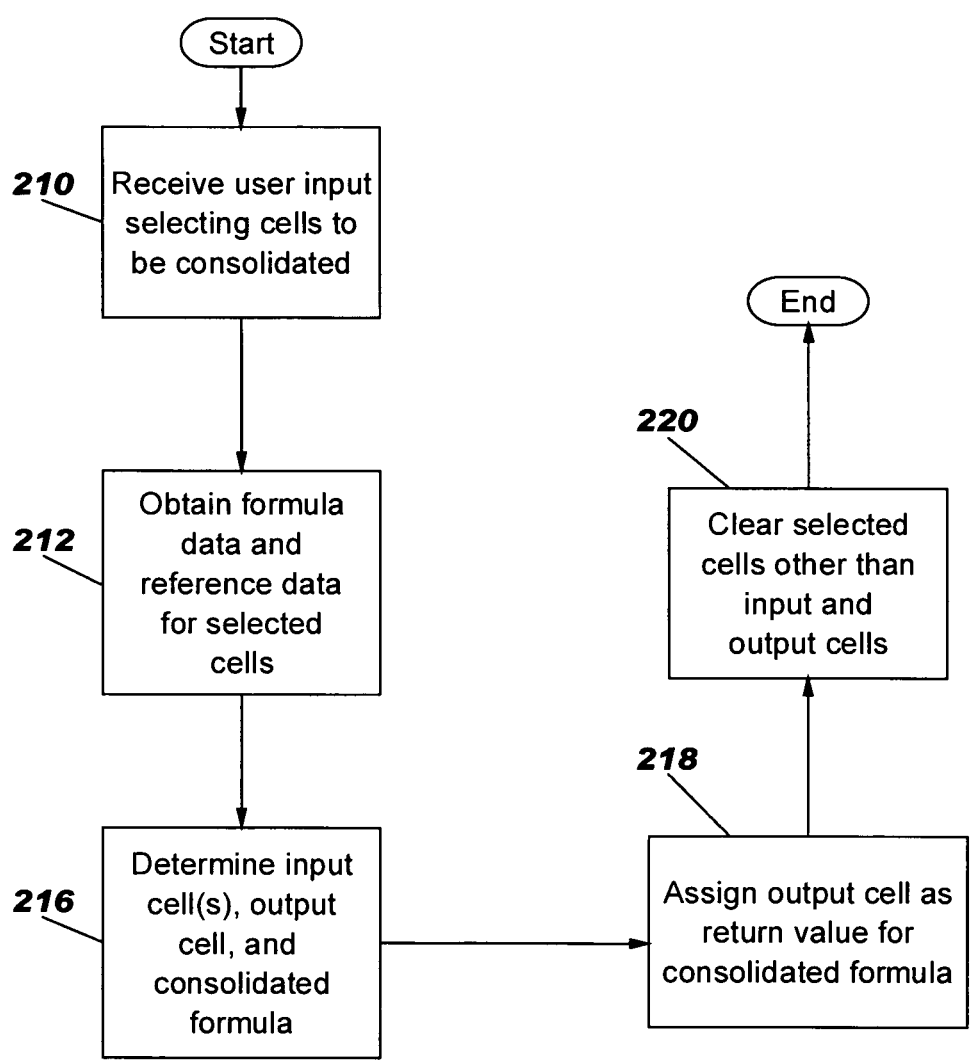
FIG. 4 is a is a further flowchart illustrating operations for processing a spreadsheet according to some embodiments of the present invention.

FIGS. 3 and 4 are flow charts illustrating methods, systems, and program products according to certain embodiments of the present invention. It will be understood that each step of the flow charts, and combinations of the steps in the flow chart diagrams, can be implemented by computer program instructions. These computer program instructions may be loaded onto a computer or other programmable data processing apparatus to produce a machine such that the instructions which execute on the computer or other programmable apparatus create means for implementing the functions specified in the flow chart step(s). These computer program instructions may also be stored in a computer readable memory that can direct a computer or other programmable apparatus to function in a particular manner, such that the instructions stored in the computer readable memory produce an article of manufacture including instruction means which implement the functions specified in the flow chart step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart step(s).

Accordingly, steps of the flow chart illustrations support combinations of means for performing the specified functions, combinations of steps for performing the specified functions and program instruction means for performing the specified function. It will also be understood that each step of the flow chart illustrations, and combinations of steps in the flow chart illustrations, can be implemented by special purpose hardware based computer systems which perform the specified functions or steps, or combinations of special purpose hardware and computer instructions.

Referring now to the flow chart of FIG. 3, operations in accordance with embodiments of the present invention for processing a spreadsheet are shown therein. In such operations, a first formula contained in a first cell is automatically consolidated with a second formula in a second cell to provide a consolidated formula (Block 202). The second formula references the first cell. The consolidated formula is stored in a single cell (Block 204). By "automatically", it is meant that the formula consolidation is executed without requiring a user to manually type, paste or the like a consolidated formula into the single cell. Rather, the consolidation of the first and second formulas is accomplished automatically by the multiple cell consolidation module 60. Automatically may include activation of a consolidation function by a user. According to some embodiments, the consolidated formula is automatically stored in the single cell without requiring any further input from the user. Further aspects of the invention and embodiments thereof are set forth below.

Certain embodiments of the present invention will now be described with reference to the flowchart of FIG. 4 and an exemplary spreadsheet 100 as shown in FIGS. 5-11.

The spreadsheet 100 has columns A-E and rows 1-9 that are displayed on the display 34 (i.e., are "on screen"), for example. The spreadsheet 100 may include additional columns and/or rows that are not shown on the display (i.e., are "off screen"), but which may be shown on the display by moving the spreadsheet in the display (e.g., by scrolling).

Figure 8:
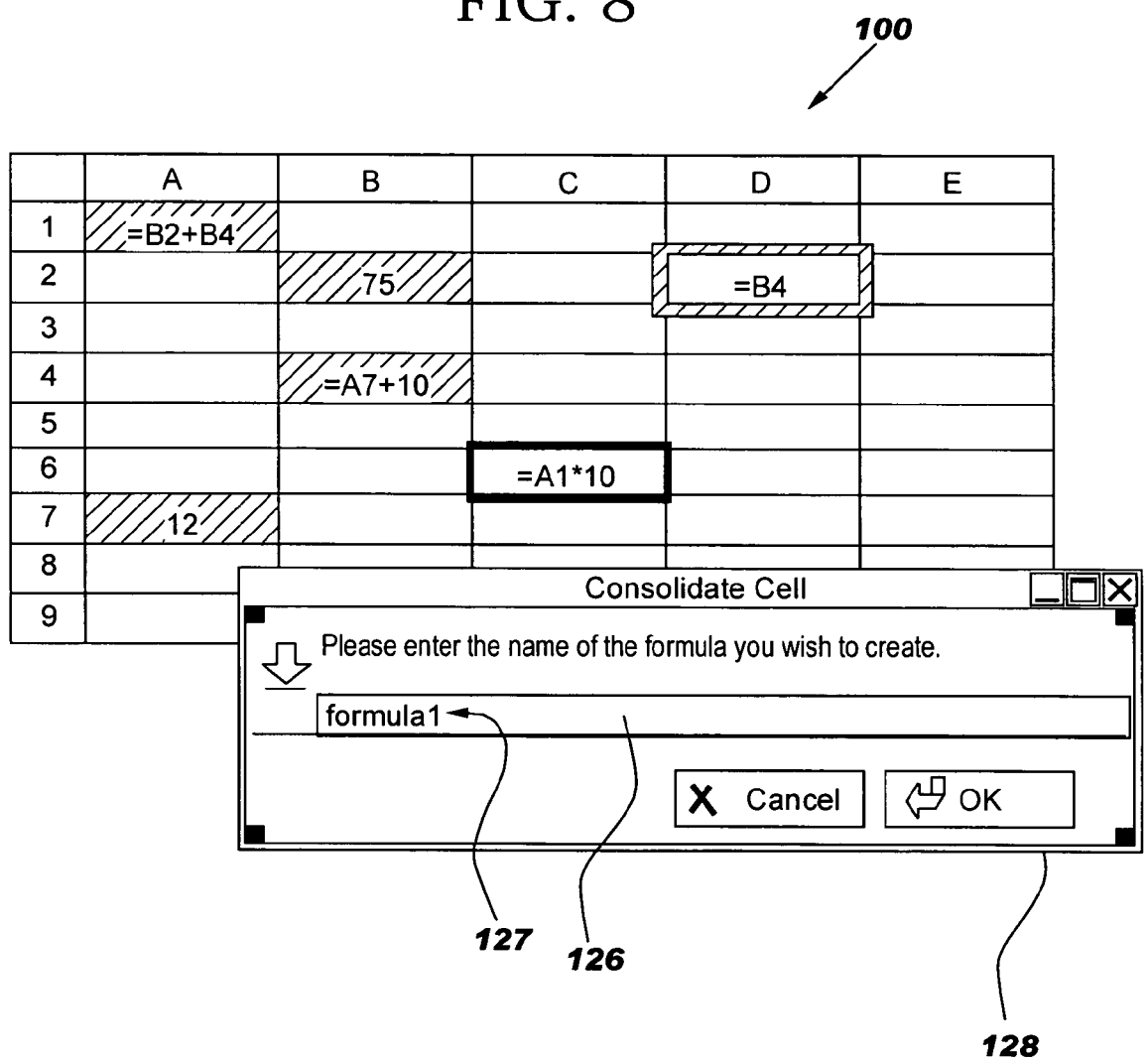
FIG. 8 represents the same spreadsheet as in FIG. 7, except that a formula name has been entered into the dialogue box according to embodiments of the invention.
Figure 9:
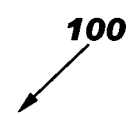
FIG. 9 represents the same spreadsheet as in FIG. 8, except that the consolidate cell feature has been executed according to embodiments of the invention.
Figure 10:
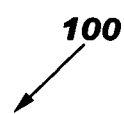
FIG. 10 represents the same spreadsheet as in FIG. 9, except that the spreadsheet is in a value display mode according to embodiments of the invention.
Figure 11:
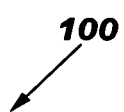
FIG. 11 represents the same spreadsheet as in FIG. 9, except that the cell C6 and input cells of the cell C6 are highlighted.

Each of the columns A-E and rows 1-9 defines a cell A1, A2, B1, B2, etc. as will be readily appreciated by those of ordinary skill in the art. As shown, at least certain of the cells have formulas or data values contained or stored therein. As shown in FIGS. 5-9 and 11, the spreadsheet 100 is in a mode wherein the formulas are themselves displayed as may be preferred for debugging, etc. However, the various aspects of the present invention may also be employed when the spreadsheet is in a mode wherein the resulting values from the formulas are displayed in place of or in addition to the formulas. As shown in FIG. 10, the spreadsheet 100 is in a mode wherein the resulting values are displayed.

Figure 5:
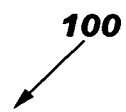
FIG. 5 represents a spreadsheet according to some embodiments of the present invention.
Figure 6:
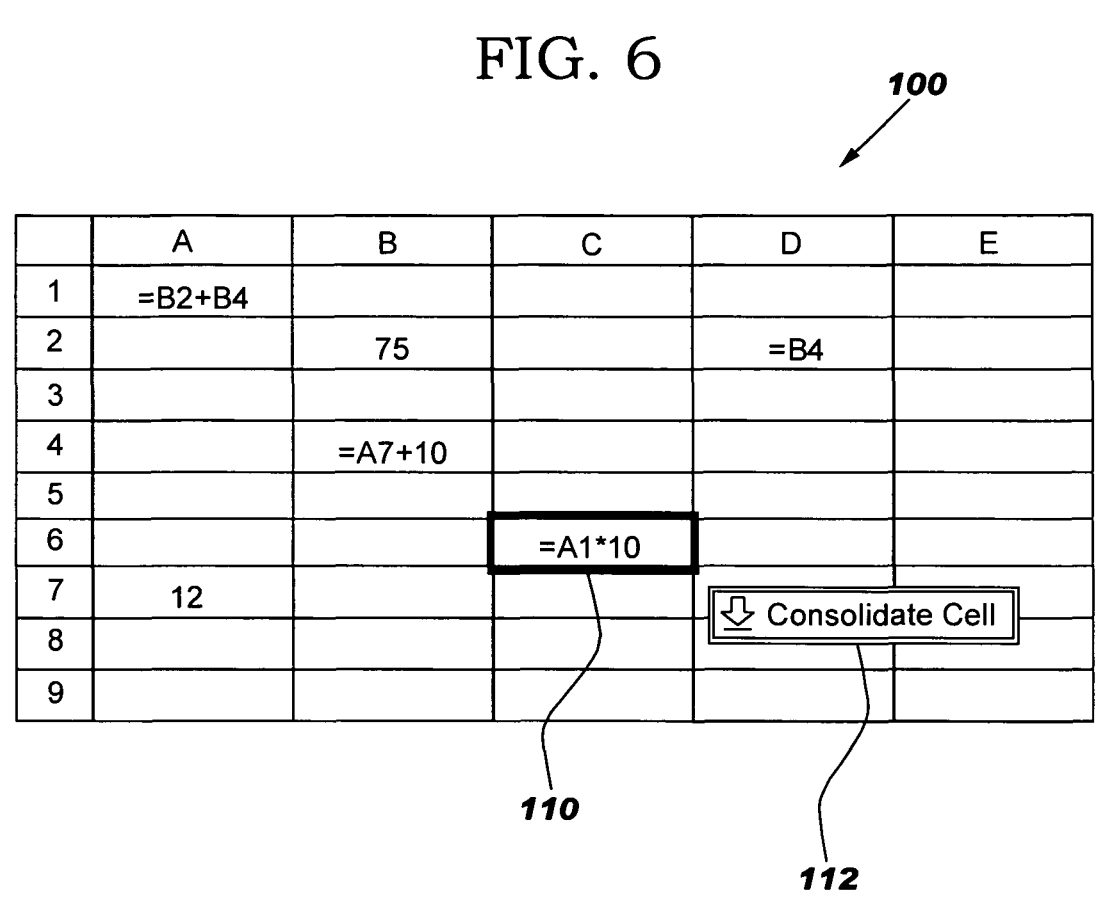

With the spreadsheet 100 initially configured as shown in FIG. 5, for example, the user may first select the cells of the spreadsheet 100 the user wishes to consolidate using the cell consolidation feature of the multiple cell consolidation module 60 (Block 210; FIG. 4). The cell consolidation feature may be enabled and the cells selected by any suitable method. For example, the cell consolidation feature may be listed as an option on a tool bar displayed adjacent the spreadsheet 100, a pull down menu thereof, a mouse right click pop up menu, etc. As shown in FIG. 6, the user has right mouse clicked on the cell C6, responsive to which the multiple cell consolidation module 60 has locked focus on the cell C6 (as indicated by a border 110) and presented a pop up menu 112. The user confirms the selection of cell C6 and the cell consolidation request by selecting "Consolidate Cell" from the pop up menu 112.

In response, the multiple cell consolidation module 60 obtains the formula data and the reference data for the selected cell C6 from the formula data module 64 and the reference data module 66 (Block 212). Using this data, the multiple cell consolidation module 60 determines the precedent tree for the cell C6 and identifies the leaf cell(s) and any intermediate branch cells (i.e., the cells between the root cell and the leaf cell(s)) of the precedent tree. In the spreadsheet 100 of FIG. 7, the precedents tree includes cell A1, which is referenced by the formula of cell C6, cell B2, which is referenced by the formula of cell A1, cell B4, which is also referenced by the formula of cell A1, and cell A7, which is referenced by the formula of cell B4.

Figure 7:
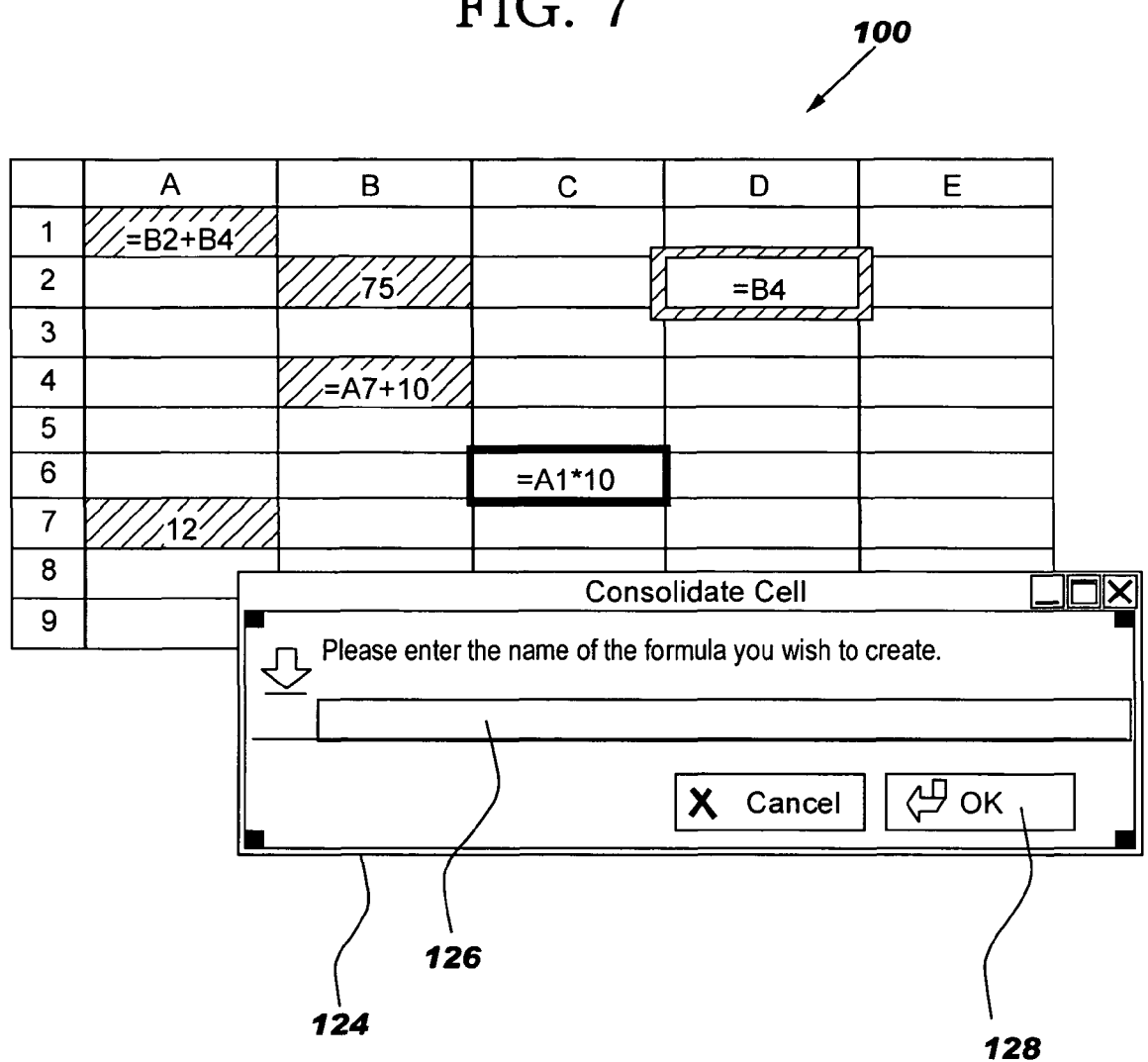
FIG. 7 represents the same spreadsheet as in FIG. 6, except that a consolidate cell feature has been activated and a dialogue box is provided according to embodiments of the invention.

The multiple cell consolidation module 60 visually indicates the cells in the precedents tree of the selected root cell C6. In the spreadsheet 100 as shown in FIG. 7, the precedent cells A1, A7, B1 and B4 are visually indicated by shading or highlighting as illustrated. It will be appreciated that any suitable technique for visually indicating or distinguishing the precedent cells may be employed. The visual indication may also differentiate between the leaf cells (cells A7 and B2) and the intermediate branch cells (cells A1 and B4).

Using the formula and reference data, the multiple cell consolidation module 60 may also identify and any cells that are not in the precedents tree of the cell C6 but which reference an intermediate branch cell of the dependents tree of the cell C6. For example, in the spreadsheet of FIG. 7, the cell D2 includes the formula "=B4" which references cell B4. The cell B4 is an intermediate branch cell of the precedents tree of the cell C6. The multiple cell consolidation module 60 may provide an alert such as a highlighting border 120 (FIG. 7) to notify the user that the cell D2 references an intermediate branch cell of the cell C6. Any suitable technique for alerting the user may be employed such as shading, a pop up message box, etc. This notification to the user may serve to warn the user that the requested cell consolidation may cause an error in another cell by making a reference of the formula of the other cell unavailable.

The multiple cell consolidation module 60 designates the root cell C6 as the output cell and, using the formula and reference data, the multiple cell consolidation module 60 analyzes the precedents tree of the cell C6 to identify the appropriate input cells and to determine the consolidated formula (Block 216). The leaf cells A7, B2 are designated as the input cells. The formula of the cell C6 and the formulas of the intermediate branch cells referenced directly or indirectly by the cell C6 are expanded to convert the formula of the cell C6 to a consolidated formula that includes cell references only to the designated input cells. This may be accomplished by simple substitution of the formulas of referenced cells for the references thereto in dependent cells. For example, the formula of A1 is expanded by substituting "A7+10" for "B4", and the formula of C6 is in turn expanded by substituting "B2+(A7+10)" for "A1". Thus, the consolidated formula becomes "=[B2+(A7+10)]*10", the only required inputs being the values located at cells B2 and A7.

While the consolidated formula of the present example includes only a single direct branch from the root cell C6, it will be appreciated that more extensive and/or complex sets or groups of cell formulas may also be consolidated in accordance with the present invention. For example, the multiple cell consolidation module 60 may accommodate cells that are referenced by multiple formulas within a precedents tree, etc.

The multiple cell consolidation module 60 provides a dialogue box 124 overlying or adjacent the spreadsheet 100, as shown in FIG. 7. The user may then enter a desired name 128 in a field 126 of the dialogue box 124 and submit the name by selecting a button 128 (FIG. 8). It will be appreciated that the dialogue box 124 may be replaced or supplemented with other suitable mechanisms for receiving input from the user. Alternatively, the multiple cell consolidation module 60 may automatically name the consolidated formula according to a default.

Submission of the formula name serves to confirm the user's selection of the cells A1, B4 and C6 for consolidation. The multiple cell consolidation module 60 then updates the spreadsheet 100 to assign the designated output cell as the return value for the consolidated formula (Block 218) and to clear the other selected cells other than the input cells (Block 220). As shown in FIG. 9. The multiple cell consolidation module 60 stores the consolidated formula "formula1" and its inputs "(B2,A7)" in the cell C6. That is, the original formula contained in the cell C6 is replaced with consolidated formula. When the spreadsheet is in the formula display mode as shown in FIG. 9, the name of the consolidated formula is displayed in the cell C6 rather than the formula itself. However, according to some embodiments, the formula name without the inputs list or the formula itself may be automatically displayed, or the user may be provided an option to display the formula name alone, the name and inputs, or the formula. The multiple cell consolidation module 60 may indicate that the cell C6 contains a consolidated formula using any other suitable technique. For example, the cell C6 may be provided with indicative coloring or shading, a border, etc.

The multiple cell consolidation module 60 also clears the formulas contained in the intermediate branch cells that have been incorporated into the consolidated formula. Thus, as shown in FIG. 9, the cells A1 and B4 have been cleared. As a result, the cells A1 and B4 are freed up and available for further use or deletion. The input cells A7 and B2 remain.

When the spreadsheet 100 is displayed in result mode as shown in FIG. 10, the result of the consolidated formula may be displayed in the cell C6 in the usual manner. In FIG. 10, the cell D2 indicates "REF ERROR!" because the reference (i.e., cell B4) for the formula of cell D2 is now an empty cell.

The multiple cell consolidation module 60 may optionally provide an input highlight feature to assist the user in identifying the input cells of the consolidated formula. For example, referring to FIG. 11, the output cell C6 is selected and the highlight feature is selected from a suitable menu. The multiple cell consolidation module 60 responds by highlighting input cells A7 and B2.

The multiple cell consolidation module 60 may also provide for selective exclusion of cells from the consolidated formula. The user may be provided the option to designate selected cells as input cells, which cells may include intermediate branch cells. For example, the user may designate the cell B4 as an input cell. In this case, the consolidated formula would be "=[B2+B4]*10". This approach may be beneficial where it is desired to retain the formula of the designated input cell (e.g., cell B4) in active status for reference by another cell (e.g., cell D2).

The multiple cell consolidation module 60 may also allow the user to individually directly select all of the cells for assessment in the consolidation procedure. For example, the user may directly select each of the input, output and intermediate cells rather than selecting a root cell from which input and intermediate cells are determined.

While in the example provided above the root cell C6 is automatically designated the output cell to which the consolidated formula is assigned, the multiple cell consolidation module 60 may allow the user to select a different cell of the spreadsheet B in which to store the consolidated formula.

Figure 12:
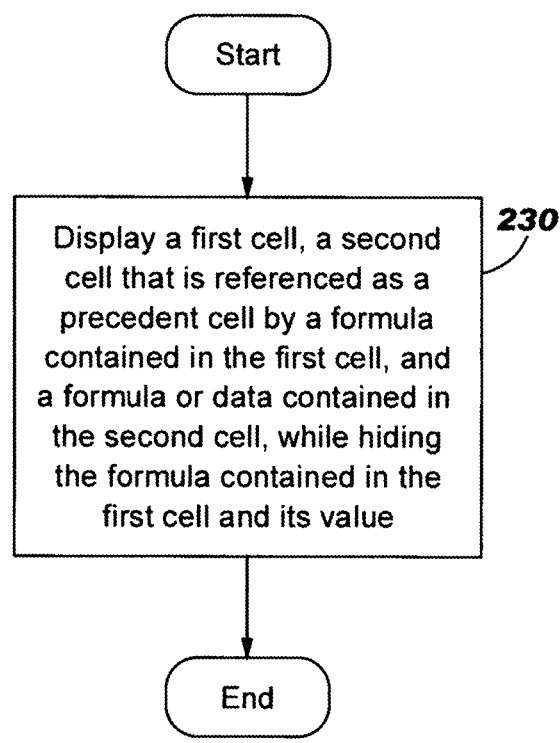
FIG. 12 is a flowchart illustrating operations for processing a spreadsheet according to further embodiments of the present invention.

In accordance with alternative embodiments of the present invention, the multiple cell consolidation module 60 may not determine a consolidated formula. With reference to the flow chart of FIG. 12, in accordance with such alternative embodiments, a first cell, a second cell that is referenced as a precedent cell by a formula contained in the first cell, and a formula or data contained in the second cell are displayed while hiding the formula contained in the first cell and its value (Block 230). More particularly, the multiple cell consolidation module 60 may determine the input, output and intermediate branch cells as described above, and then hide the intermediate cells while displaying the formulas and data of the input and output cells in their respective cells. That is, the intermediate formulas that were incorporated into the consolidated formula and cleared in the foregoing embodiments are instead retained in their cells and hidden. By "hidden", it is meant that neither the formula itself nor its result or value is displayed in the cell. The underlying structure of the spreadsheet 100 is unchanged, but the appearance of the spreadsheet is simplified.

Figure 13:
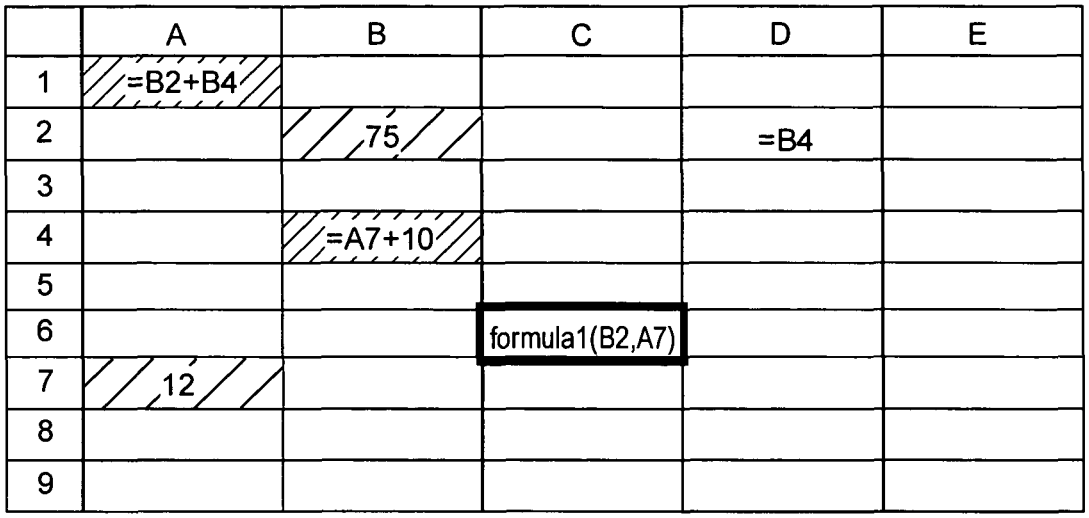
FIG. 13 represents the same spreadsheet as in FIG. 9, except that a consolidate cell feature according to alternative embodiments of the present invention has been executed, the cell C6 has been selected, the cells depending from cell C6 are highlighted, and hidden formulas are displayed in cells A1 and B4.

The alternative embodiments of the present invention as described just above may be preferable where the values of the intermediate cells are or may be needed by other cells, such as the cell D2. One or more of the additional features described above may be employed as well with suitable modifications. For example, the multiple cell consolidation module 60 may provide a feature as described above for highlighting input cells, but wherein the intermediate cells (e.g., the cells A1, B4) are also highlighted and their hidden formulas are displayed as shown in FIG. 13. The intermediate, hidden formula cells may be differentiated from the input cells in this mode by different colors, shading, borders, etc. The cells containing hidden formulas may also be visually indicated (e.g., by color, shading, borders, etc.) when the formulas are hidden. The existence of hidden cells in the spreadsheet 100 is generally indicated by the formula name or special indicia in the output cell C6.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

That which is claimed is:

1. A method for processing cells in a spreadsheet, the method comprising:
   displaying a spreadsheet, said spreadsheet including a plurality of cells, some of said cells containing data and some of said cells containing formulas;
   receiving user selection of a root cell of said spreadsheet, said root cell containing a root formula;
   automatically determining a precedent tree for said root cell, said precedent tree including at least one input cell and at least one intermediate cell between said input cell and said root cell, said at least one intermediate cell containing an intermediate formula;
   automatically combining all the intermediate formulae identified in the precedent tree into said root formula to provide a consolidated formula;
   storing the consolidated formula in a single cell; and
   freeing up any intermediate cell from which an intermediate formula was combined into the consolidated formula.

2. The method of claim 1, wherein storing the consolidate formula in a single cell comprises replacing the root formula in the root cell with the consolidated formula, the consolidated formula then occupying the root cell.

3. The method of claim 1, further comprising visually indicating to a user on the displayed spreadsheet all of the cells in the precedent tree.

4. The method of claim 3, further comprising visually differentiated input cells from intermediate cells in said precedent tree.

5. The method of claim 1, further comprising receiving user input designating one or more intermediate cell to exclude from the combining of intermediate formulae into the root formula.

6. The method of claim 1, further comprising identifying any affected cells of the spreadsheet that are not in the precedent tree but which reference any of the intermediate cells of the precedent tree.

7. The method of claim 6, further comprising visually indicating any affected cells to a user on the displayed spread sheet.

8. The method of claim 7, further comprising excluding one or more intermediate cells referred to by an affected cell from the combining of intermediate formulae into the root formula.

9. The method of claim 1, further comprising prompting a user to input a name for the consolidated formula.

10. The method of claim 1, wherein the consolidated formula produces a same output as did the root formula.

11. A computer program product comprising a memory device storing instructions for a processor, causing the processor to perform a method comprising:
   displaying a spreadsheet, said spreadsheet including a plurality of cells, some of said cells containing data and some of said cells containing formulas;
   receiving user selection of a root cell of said spreadsheet, said root cell containing a root formula;
   automatically determining a precedent tree for said root cell, said precedent tree including at least one input cell and at least one intermediate cell between said input cell and said root cell, said at least one intermediate cell containing an intermediate formula;
   automatically combining all the intermediate formulae identified in the precedent tree into said root formula to provide a consolidated formula;
   storing the consolidated formula in a single cell; and
   free up any intermediate cell from which an intermediate formula was combined into the consolidated formula.

12. The computer program product of claim 11, wherein the method further comprises clearing any intermediate cell from which an intermediate formula was combined into the consolidated formula so that the cleared intermediate cell is then empty of both data and a formula and ready to receive either.

13. The computer program product of claim 11, wherein the method further comprises replacing the root formula in the root cell with the consolidated formula, the consolidated formula then occupying the root cell.

14. The computer program product of claim 11, wherein the method further comprises visually indicating to a user on the displayed spreadsheet all of the cells in the precedent tree.

15. The computer program product of claim 11, wherein the method further comprises visually differentiated input cells from intermediate cells in said precedent tree.

16. The computer program product of claim 11, wherein the method further comprises receiving user input designating one or more intermediate cell to exclude from the combining of intermediate formulae into the root formula.

17. The computer program product of claim 11, wherein the method further comprises identifying any affected cells of the spreadsheet that are not in the precedent tree but which reference any of the intermediate cells of the precedent tree.

18. The computer program product of claim 17, wherein the method further comprises visually indicating any affected cells to a user on the displayed spread sheet.

19. The computer program product of claim 18, wherein the method further comprises excluding one or more intermediate cells referred to by an affected cell from the combining of intermediate formulae into the root formula.

20. The computer program product of claim 11, wherein the method further comprises prompting a user to input a name for the consolidated formula.

21. The computer program product of claim 11, wherein the consolidated formula produces a same output as did the root formula.

* * * * *